United States Patent
Yoon et al.

(10) Patent No.: US 7,864,245 B2
(45) Date of Patent: Jan. 4, 2011

(54) CAMERA MODULE AND METHOD OF MANUFACTURING THE SAME

(75) Inventors: Dong-hyeon Yoon, Seongnam-si (KR); Ha-cheon Jeong, Seongnam-si (KR); San-deok Hwang, Seongnam-si (KR); Sam-gi Park, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1624 days.

(21) Appl. No.: 11/108,226

(22) Filed: Apr. 18, 2005

(65) Prior Publication Data

US 2006/0103758 A1    May 18, 2006

(30) Foreign Application Priority Data

Nov. 12, 2004  (KR)  ............... 10-2004-0092265
Nov. 12, 2004  (KR)  ............... 10-2004-0092266

(51) Int. Cl.
*H04N 5/225* (2006.01)
(52) U.S. Cl. .................. 348/374; 348/340
(58) Field of Classification Search ............ 348/340
See application file for complete search history.

(56) References Cited

U.S. PATENT DOCUMENTS

| | | | |
|---|---|---|---|
| 3,980,367 A * | 9/1976 | Laserson et al. | 439/65 |
| 5,784,660 A * | 7/1998 | Tanaka | 396/440 |
| 6,842,585 B2 * | 1/2005 | Matsuo et al. | 396/89 |
| 7,340,161 B2 * | 3/2008 | Asai et al. | 396/89 |
| 7,589,787 B2 * | 9/2009 | Shinomiya | 348/374 |
| 2004/0189862 A1 * | 9/2004 | Gustavsson et al. | 348/376 |
| 2004/0212702 A1 * | 10/2004 | Suh | 348/240.99 |
| 2004/0245649 A1 * | 12/2004 | Imaoka | 257/774 |
| 2005/0285973 A1 * | 12/2005 | Singh et al. | 348/374 |
| 2007/0122146 A1 * | 5/2007 | Ryu | 396/529 |
| 2008/0170141 A1 * | 7/2008 | Tam et al. | 348/294 |

\* cited by examiner

*Primary Examiner*—Jason Chan
*Assistant Examiner*—Cynthia Calderon
(74) *Attorney, Agent, or Firm*—Drinker Biddle & Reath LLP

(57) ABSTRACT

Provided is a camera module that includes: an image sensing device; a first signal transmitting element on which there are formed a device coupling portion that is coupled to the image sensing device, and an external coupling portion that extends from one end of the device coupling portion to protrude from the image sensing device and is coupled to an external substrate; an auto-focus (AF) module including: an AF device, and a second signal transmitting element coupled to the first signal transmitting element to electrically connect the AF device and the external substrate; a lens module including a plurality of lens which focuses light onto the image sensing device; and a coupling element that couples the first and second signal transmitting elements so that they are electrically connected.

7 Claims, 11 Drawing Sheets

Legend A

- 100: camera module
- 120: image sensor module
- 121: image sensing device
- 124: first signal transmitting element
- 125: device coupling portion
- 126: external coupling portion
- 127: connector
- 128: extension coupling portion
- 130: AF module
- 131: AF housing
- 132: boss unit
- 134: second signal transmitting element
- 140: coupling element
- 143: passive device Legend B 200: camera module
220: image sensor module
121: image sensing device
224: first signal transmitting element
125: device coupling portion
126: external coupling portion
127: connector
228: extension coupling portion
230: AF module
131: AF housing
135: AF connecting portion
136: first extension portion
143: passive device
234: second signal transmitting element
237: second extension portion

CAMERA MODULE AND METHOD OF MANUFACTURING THE SAME

CROSS-REFERENCE TO RELATED PATENT APPLICATIONS

This application claims the priority of Korean Patent Application Nos. 10-2004-0092265 and 10-2004-0092266, both filed on Nov. 12, 2004, in the Korean Intellectual Property Office, the disclosure of which are incorporated herein in their entirety by reference.

BACKGROUND OF THE INVENTION

1. Field of the Invention

The present invention relates to a camera module and a method of manufacturing the same, and more particularly to a camera module connected to an external substrate and including an image sensing module and an auto-focus (AF) module, and a method of manufacturing the same.

2. Description of the Related Art

A camera module that performs photographing operations is embedded in electronic devices, such as mobile phones, personal digital assistants (PDAs), notebook computers, and cameras (e.g., installed on back bumpers or doors). Such a camera module is very small to comply with the miniaturization requirements of mobile devices.

Typically, a camera module included in a miniature mobile device includes an image sensor module and a lens housing disposed on one side of the image sensor module. The image sensor module includes an image device, a circuit board electrically connected to the image device, a flexible printed circuit board (FPCB) for outputting the photographed images signals to an external circuit, and so on. At least one lens is installed in the lens housing, and an infrared (IR) filter may be further included in the lens housing.

The majority of image devices in digital cameras, for example, have an automatically focusing function performed by moving along an optical axis. Recently, the automatic focusing function has been embedded in camera modules too.

Referring to FIG. 1 which is an exploded perspective view of a conventional camera module 10, and FIG. 2 which is a side view of the camera module 10, the camera module 10 includes an image sensor module 20, an auto focus (AF) module 30, and a lens module 40.

The image sensor module 20 includes a first signal transmitting element 24 on which a conventional circuit pattern is formed, and an image sensing device 21 which photographs an image of an external object and is electrically connected to an external substrate.

A photographing area is formed on the image sensing device 21 which senses light energy incident from the outside and converts it into electrical signals. That is, the image sensing device 21 is a charge-coupled device (CCD) or a complementary metal oxide semiconductor (CMOS).

The first signal transmitting element 24 may be a conventional printed circuit board (PCB). Alternatively, the first signal transmitting element 24 may be a flexible printed circuit board (FPCB) such as a tape carrier package (TCP) and a chip-on-film (COF), depending on where the image sensor module 20 is used.

In this case, one end of the first signal transmitting element 24 is coupled to the image sensing device 21, and a connector 27 is formed on the other end of the first signal transmitting element 24 so that the other end of the first signal transmitting element 24 can be coupled to the external substrate.

The AF module 30 may include at least one AF device (not shown) composed of a side sensor, a condenser lens (not shown) for focusing light onto the side sensor, and a location detecting element (not shown) for detecting a focusing location. The AF device, the condenser lens, and the location detecting element are accommodated inside an AF housing 31.

In addition, the AF module 30 includes a second signal transmitting element 34 coupled to the AF device, to transmit power and signals between the external substrate and the AF device.

The second signal transmitting element 34 may also be a conventional PCB, or a FPCB such as TCP and COF, depending on where the image sensor module 20 is used. In this case, one end of the second signal transmitting element 34 is coupled to the AF device, and a connector 37 is formed on the other end of the second signal transmitting element 34, to be coupled to the external substrate.

If the first and second signal transmitting elements 24 and 34 are FPCBs, they generally include a base layer formed of polyimide or polyester, and an insulating layer deposited on the circuit pattern.

The lens module 40 includes a lens housing 41 and at least one lens 42. The lens module 40 may further include a filter (not shown) to block infrared (IR) rays incident inside the lens housing 41 and to prevent refection of light incident inside the lens housing 41. The filter is installed at the bottom portion of a through-hole of the lens housing 41 from one side of the image sensing device 21. An IR-cut coating is disposed on the top portion of the filter, and an anti-reflection coating, which is for preventing reflection of light, is disposed on the bottom portion of the filter.

In this case, if the first signal transmitting element 24 provided in the image sensor module 20 and the second signal transmitting element 34 provided in the AF module 30 each include connectors 27 and 37 that are separately connected to the external substrate, the external substrate has to receive or supply signals and power separately from the connecter 27 of the image sensor module 20 and the connecter 37 of the AP module 30. Thus, the size of the camera module 10 is enlarged, and signal loss due to noise occurs.

However, in order to include the automatic focusing function in a conventional camera module, an additional AF module is required and such AF module needs to be connected to an external main board. Therefore, separate connecting ports are required since the image sensor module and the AF module need separate power ports and signal ports.

That is, assuming that a camera module is embedded in a mobile phone, a main board of the mobile phone has to supply signals and power to an AF module and an image sensor module. Thus, the overall structure of the camera module becomes complex.

Furthermore, since the camera module and the AF module have separate power ports, signal loss due to noise occurs.

SUMMARY OF THE INVENTION

The present invention provides a camera module in which a port connecting an auto focus (AF) module and an external substrate, and a port connecting an image sensor module and the external substrate are formed in a single body, and a method of manufacturing the camera module.

According to an aspect of the present invention, there is provided a camera module including an image sensing device, a first signal transmitting element, an AF module, a lens module, and a coupling element. The image sensing device is coupled to the first signal transmitting element. The first signal transmitting element includes a device coupling portion and an external coupling portion. The device coupling portion is coupled to the image sensing device, and the external coupling portion extends from one end of the device coupling portion to protrude from the image sensing device. The AF module includes an AF device and a second signal transmitting element. The second signal transmitting element is connected to the AF device and electrically connects the AF device and the external substrate. The lens module includes a plurality of lenses which focus light onto the image sensing device. The coupling element couples the first and second signal transmitting elements so that they are electrically connected.

According to another aspect of the present invention, there is provided a camera module that includes: an image sensing device, a first signal transmitting element, an AF module, and a lens module. The first signal transmitting element includes: a device coupling portion that is coupled to the image sensing device; an external coupling portion that extends from one end of the device coupling portion to be protruded from the image sensing device, and is coupled to an external substrate; and an extension coupling portion having a first pattern exposure unit in which a circuit pattern is exposed to the outside, and extends from other end of the device coupling portion to be protruded from the image sensing device. The AF module includes an AF device, and a second pattern exposure unit of which a circuit pattern is exposed to the outside and is coupled to the first pattern exposure unit, and the AF module being coupled to the AF device. The lens module may include a plurality of lenses which focus light onto the image sensing device.

According to another aspect of the present invention, there is provided a method of manufacturing a camera module. The method includes: manufacturing an image sensor module; manufacturing an AF module; coupling the first pattern exposure unit and the second pattern exposure unit; and placing the second signal transmitting element on top of the AF module.

The manufacturing of the image sensor module includes bonding a device coupling portion of a first signal transmitting unit to an image sensor module, the first signal transmitting unit including the device coupling portion, an external coupling portion that is coupled to an external substrate by being extended from one end of the device coupling portion, and an extension coupling portion that extends from other end of the device coupling portion and has a first pattern exposure unit in which a circuit pattern is exposed to the outside. The manufacturing of the AF module includes bonding a second signal transmitting element to an auto-focus housing having an auto-focus device accommodated therein, the second signal transmitting element including a second pattern exposure unit in which a circuit pattern is exposed to the outside. The coupling of the first pattern exposure unit and the second pattern exposure unit is performed by coupling the first pattern exposure unit of the first signal transmitting element and the second pattern exposure unit of the second signal transmitting unit. The placing the second signal transmitting element on top of the AF module is performed by bending the second signal transmitting element.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 3:
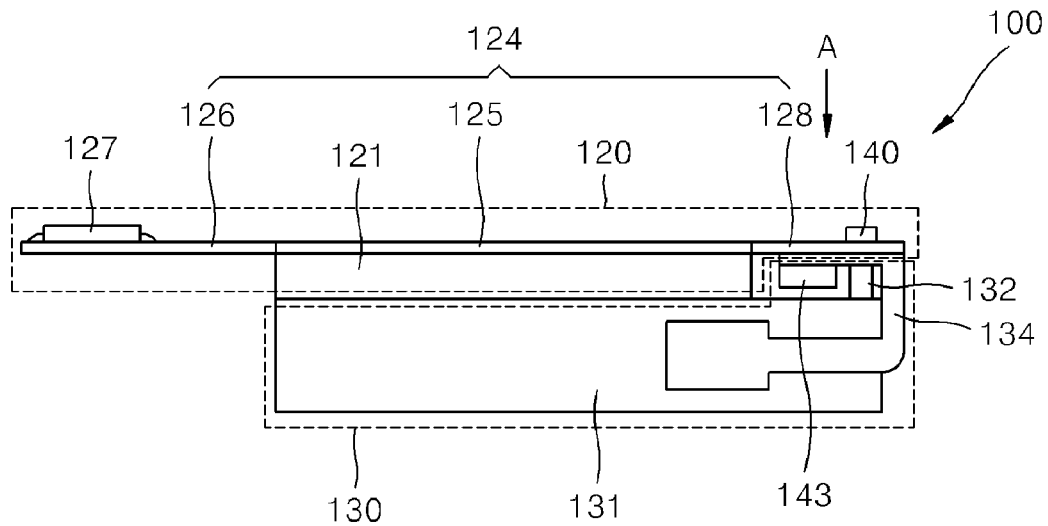
FIG. 3 is a side view of a camera module according to a first embodiment of the present invention.

A camera module 100 according to a first embodiment of the present invention includes a coupling element 140 which electrically connects first and second signal transmitting elements 124 and 134, as illustrated in FIG. 3. Connectors 27 and 28 (see FIG. 1), which connect the module 100 to an external substrate (e.g., a PCB or motherboard) of a device such as a PDA, wireless phone, and the like, can be combined to form a single body.

Figure 1:
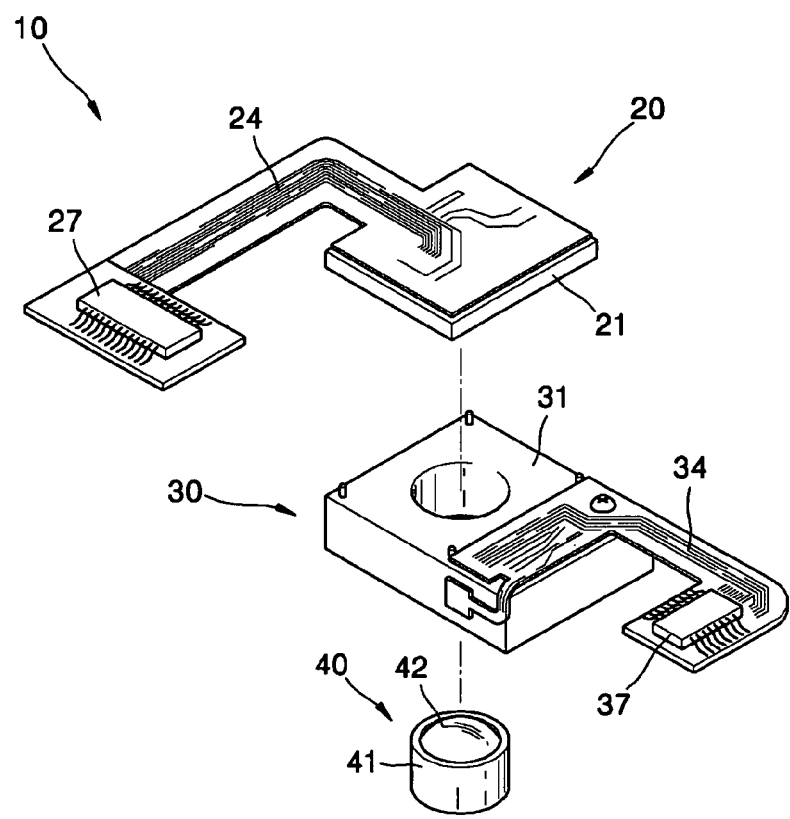
FIG. 1 is an exploded perspective view of a conventional camera module including an auto focus (AF) module and an image sensing module.
Figure 2:
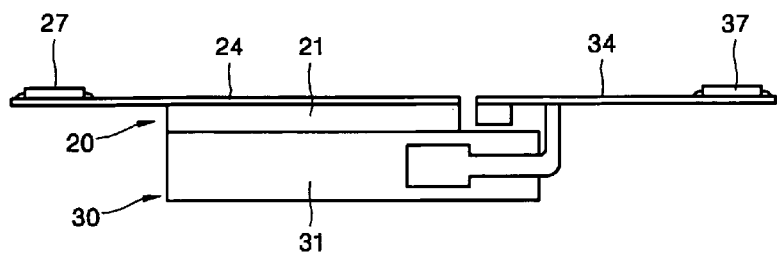
FIG. 2 is a side view of the camera module of FIG. 1.

As shown in FIG. 3, the camera module 100 may include an image sensing device 121, a first signal transmitting element 124, an AF module 130 and a lens module (e.g., lens module 40 illustrated in FIG. 1). In this case, the image sensing device 121, which is a conventional image device, and the first signal transmitting element 124 can be combined to form an image sensor module 120.

In this case, a device coupling portion 125 coupled to the image sensing device 121, a connector 127 of which one end is coupled to an external substrate, and an external coupling portion 126 extending from the device coupling portion 125 and protruding towards outside the image sensing device 121 are formed on the first signal transmitting element 124. Therefore, unlike the conventional camera module 10 (FIG. 1), the second signal transmitting element 134 is not directly electrically connected to the external substrate. Instead, the second signal transmitting element 134 is coupled to the first signal transmitting element 124, thereby electrically connecting the AF module 130 to the external substrate via the external coupling portion 126 of the first signal transmitting element 124, which obviates the need for separate connectors for the AF module 130 and the image sensor module 120.

Thus, the external substrate does not need to supply separate signals or power to the AF module 130 and the image sensor module 120, thereby reducing the size of the camera module 100 and reducing signal loss due to noise.

Figure 4:
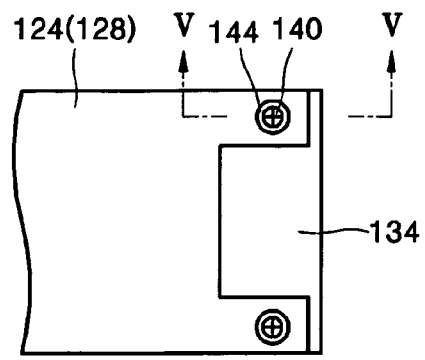
FIG. 4 is a plan view of portion A in FIG. 3.
Figure 5:
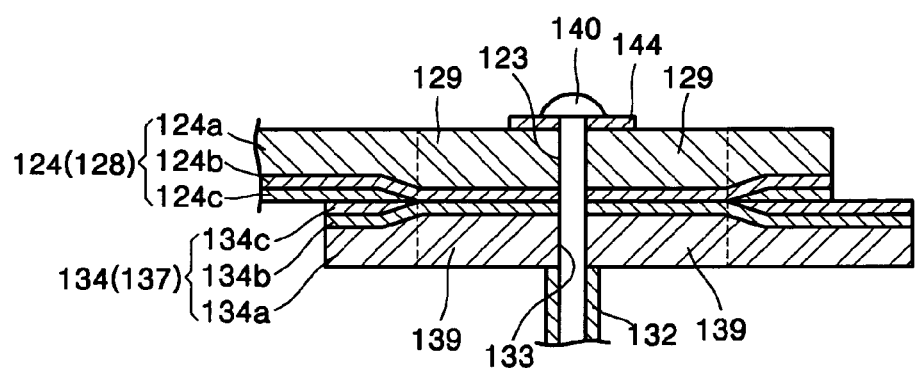
FIG. 5 is a cross-section view along the line V-V in FIG. 4.

In this case, as illustrated in FIGS. 4 and 5, a first pattern exposure unit 129 is formed on the first signal transmitting element 124, and a second pattern exposure unit 139 contacting the first pattern exposure unit 129 is formed on the second signal transmitting element 134. In this case, the first and second signal transmitting elements 124 and 134 can be electrically connected by a coupling such as a fastener, adhesive or other coupling means known in the art. As can be appreciated, if the first and second signal transmitting elements 124 and 134 are FPCBs, the first and second signal transmitting elements 124 and 134 may include respective base layers 124a and 134a composed of, for example, polyimides or polymers, respective circuit patterns 124b and 134b patterned on the surfaces of the base layers 124a and 134a, and respective insulating layers 124c and 134c formed on the circuit patterns 124b and 134b. The first and second pattern exposure units 129, 139 expose portions of circuit patterns 124b and 134b therebeneath.

The first pattern exposure unit 129 may be formed on an extension coupling portion 128. In this case, the external coupling portion 126 extends from one end of the device coupling portion 125, protruding away from the image sensing device 121, and the extension coupling portion 128 may be protruded from the other end of the image sensing device 121 in the opposite direction to where the external coupling portion 126 is disposed.

The camera module 100 according to the present embodiment includes the coupling element 140. The coupling element 140 mechanically couples the first signal transmitting element 124 and the second signal transmitting element 134 so that the surfaces of the circuit pattern 124b of the first pattern exposure unit 129 and the circuit pattern 134b of the second pattern exposure unit 139 are held in contact with each other. Although the coupling element 140 is illustrated as a screw, the element 140 may be a bolt, a key, a cotter, a clamp and a pin joint.

In this case, as illustrated in FIGS. 4 and 5, coupling holes 123 and 133 are respectively formed on the extension coupling portion 128 of the first signal transmitting element 124 and the second signal transmitting element 134. The coupling element 140 may couple the first and second signal transmitting elements 124 and 134 by passing through the aligned coupling holes 123 and 133.

That is, the second signal transmitting element 134 of the AF module 130 surrounds one side of an AF housing 131, which accommodates the AF device, and extends towards the top portion of the AF housing 131. The image sensor module 120 is mounted on top of the AF housing 131 in a way that it does not interfere with the second signal transmitting element 134, and the extension coupling portion 128 is disposed to be in contact with the second signal transmitting element 134. In this case, the extension coupling portion 128 is disposed on top of the second signal transmitting element 134 where the first and second signal transmitting elements 124 and 134 overlap and contact each other. In addition, the coupling holes 123 and 133 are respectively formed on one end of the extension coupling portion 128 and the corresponding second signal transmitting element 134. The coupling element 140 passes through the coupling holes 123 and 133, thereby coupling the first and second signal transmitting elements 124 and 134.

As further shown in FIG. 3, a passive device 143 may be installed on the second signal transmitting element 134. In this case, the passive device 143 should not be damaged by the coupling element 140 when coupling the extension coupling portion 128 and the second signal transmitting element 134. Therefore, preferably, the passive device 143 is mounted on the bottom of a bent portion of the second signal transmitting element 134, above the AF housing 131, that is, closer to the top surface of the AF housing 131, so that the passive device 143 is not exposed to the outside, and at the same time, the first signal transmitting element 124 is formed on the top of the bent portion of the second signal transmitting element 134, further away from the top of the AF housing 131, so that the first signal transmitting element 124 does not interfere with the passive device 143.

An example of such a structure is as follows. A boss unit 132 is formed on the AF housing 131 on a top surface proximate to an area that corresponds to the coupling holes 123 and 133. Thus, a screw being the coupling element 140 is inserted through the holes 123, 133 and is received and secured in the boss unit 132. Further as shown, a washer 144 may be disposed between the screw and the top of the extension coupling portion 128.

To manufacture the camera module 100 having the above-described structure, first, the first signal transmitting element 124 is disposed on one side of the image sensing device 121. In this case, the first signal transmitting element 124 includes the device coupling portion 125 coupled to the image sensing device 121, the external coupling portion 126 extending away from the image sensing device 121 to contact the external substrate, and the extension coupling portion 128 extending away from the image sensing device 121 towards the opposite direction to where the external coupling portion 126 is disposed. Also, the circuit pattern 124b is exposed at an area of the bottom end of the extension coupling portion 128 that is to be in contact with the second signal transmitting element 134.

Along with the image sensing device 121, the AF module 130 is manufactured. As shown in FIG. 3, the AF module 130 includes the second signal transmitting element 134. The second signal transmitting element 134 is coupled to the extension coupling portion 128 of the first signal transmitting element 124 and is wrapped around a portion of a sidewall of the AF module 130. The passive device 143 may be disposed on the bottom portion of the second signal transmitting element 134. In this case, the circuit pattern 134b that is exposed is located at an area corresponding to the extension coupling portion 128 among the top surface of the second signal transmitting element 134.

Then, the image sensor module 120 and the AF module 130 are coupled together. At this time, the exposed circuit pattern 124b at the first signal transmitting element 124 of the image sensor module 120 is in contact with the exposed circuit pattern 134b at the second signal transmitting element 134 of the AF module 130. That is, the extension coupling portion 128 and the bent portion of the second signal transmitting element 134 contact each other with the extension coupling portion 128 being on the top and the second signal transmitting element 134 being on the bottom where the portions 128, 138 overlap. Also, the extension coupling portion 128 and the second signal transmitting element 134 are electrically connected and coupled via the coupling element 140.

In other embodiments the surfaces of the first and second pattern exposure units 129 and 139 may be directly attached instead of by coupling them with the coupling element 140. In this way the electrical connection between the first and second pattern exposure units 129 and 139 may be improved.

Figure 6:
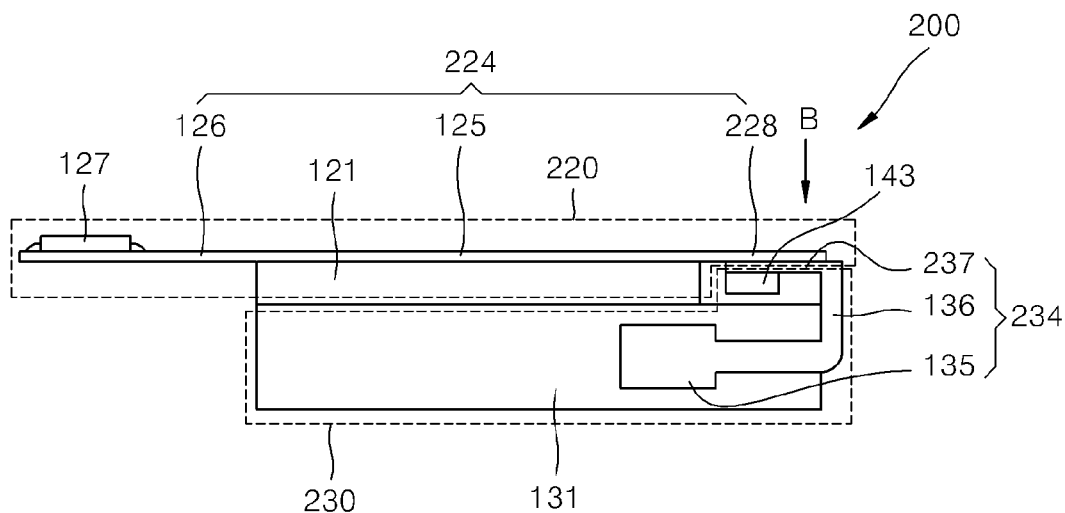
FIG. 6 is a side view of a camera module according to a second embodiment of the present invention.
Figure 7:
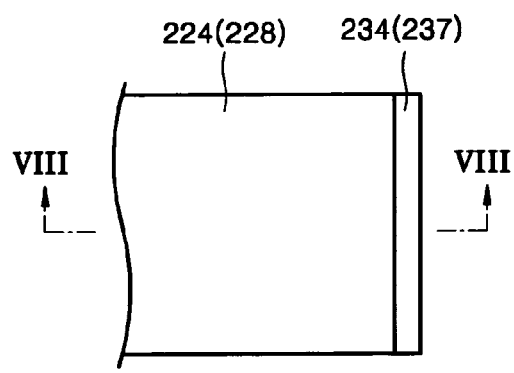
FIG. 7 is a plan view of portion B in FIG. 6.
Figure 8:
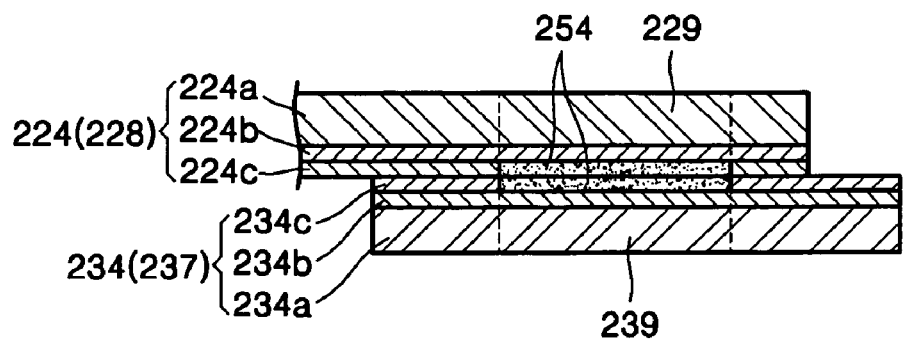
FIG. 8 is a cross-section view along the line VIII-VIII in FIG. 7.

Therefore, a camera module according to a second embodiment of the present invention is provided that does not need the coupling element 140 illustrated in FIGS. 3 through 5. Referring now to FIGS. 6 through 8, the camera module 200 includes a first signal transmitting element 224 with a first pattern exposure unit 229 and a second signal transmitting element 234 that may include a second pattern exposure unit 239. As can be appreciated from FIG. 8, the first and second pattern exposure units 229 and 239 are areas in which circuit patterns 224b and 234b are exposed on the first and second signal transmitting elements 224 and 234. Further, adhesives 254 are interposed between the first and second pattern exposure units 229 and 239, thereby electrically connecting the first and second pattern exposure units 229 and 239 and respective circuit patterns 224b, 234b.

In this case, the first signal transmitting element 224 may include an external coupling portion. 126, a device coupling portion 125, and an extension coupling portion 228. The external coupling portion 126 extends from one end of the device coupling portion 125 to protrude away from an image sensing device 121 in a first direction. The extension coupling portion 228 may protrude away from the image sensing device 121 oppositely from the first direction. In this case, the first pattern exposure unit 229 may be disposed in the extension coupling portion 228.

The second signal transmitting element 234 may include an AF connecting portion 135, a first extension portion 136, and a second extension portion 237. The AF connecting portion 135 is connected to an AF device (not shown). The first extension portion 136 extends from the AF connecting portion 135 and is disposed along a side wall of an AF housing 131. The second connecting unit 237 extends from the first extension portion 136 and is parallel to the top surface of the AF housing 131. In this case, the second pattern exposure unit 239 may be disposed in the second extension portion 237. Therefore, the first and second signal transmitting elements 224 and 234 may easily be electrically connected by coupling the first pattern exposure unit 229 disposed in the extension coupling portion 228 and the second pattern exposure unit 239 disposed in the second extension portion 237.

As can be appreciated from FIG. 8, adhesives 254 such as conductive pastes, nonconductive pastes, or conductive films are interposed between each of the first and second pattern exposure units 229 and 239. The first and second signal transmitting elements 224 and 234 can be electrically connected by the mutually adhesion of the adhesives 254. That is, if the first and second signal transmitting elements 224 and 234 are FPCBs, for example, the first and second signal transmitting elements 224 and 234 may include respective base layers 224a and 234a composed of, for example, polyimides or polymers, respective circuit patterns 224b and 234b patterned on the surfaces of the base layers 224a and 234a, and respective insulating layers 224c and 234c formed on the circuit patterns 224b and 234b. To expose the circuit patterns 224b and 234b, the insulating layers 224c and 234c formed on the circuit patterns 224b and 234b need to be at least partially or selectively removed. As a result, when the insulating layers 224c and 234c are removed, a gap occurs between the first and second signal transmitting elements 224 and 234 and the circuit patterns 224b and 234b. Preferably, the adhesives 254 such as conductive pastes, nonconductive pastes, or conductive films are disposed on the circuit patterns 224b and 234b to prevent the gap from occurring. Here, the adhesives 254 may be an anisotropic conductive film (ACF), an anisotropic conductive paste (ACP) or a solder, but other suitable adhesives 254 may be used.

Consequently, an external substrate does not need to separately supply power or signals to an AF module 230 and an image sensor module 220. Thus, signal loss due to noise is reduced.

In this case, the second signal transmitting element 234 of the AF module 230 surrounds one side of the AF housing 131, and may extend towards the top of the AF housing 131. The image sensor module 220 is mounted on top of the AF housing 131 in a way that does not interfere with the second signal transmitting element 234, and the extension coupling portion 228 is disposed to be in contact with the second signal transmitting element 234 on top of the AF housing 131. In this case, the first pattern exposure unit 229 of the extension coupling portion 228 is disposed on the top surface of the location where the first and second signal transmitting elements 224 and 234 contacts each other and the second pattern exposure unit 239 of the second extension portion 237 is disposed on the bottom surface of the location where the first and second signal transmitting elements 224 and 234 contacts each other, and the first and second pattern exposure units 229 and 239 are in contact with each other. Thus, the camera module 200 may be miniaturized.

Figure 9:
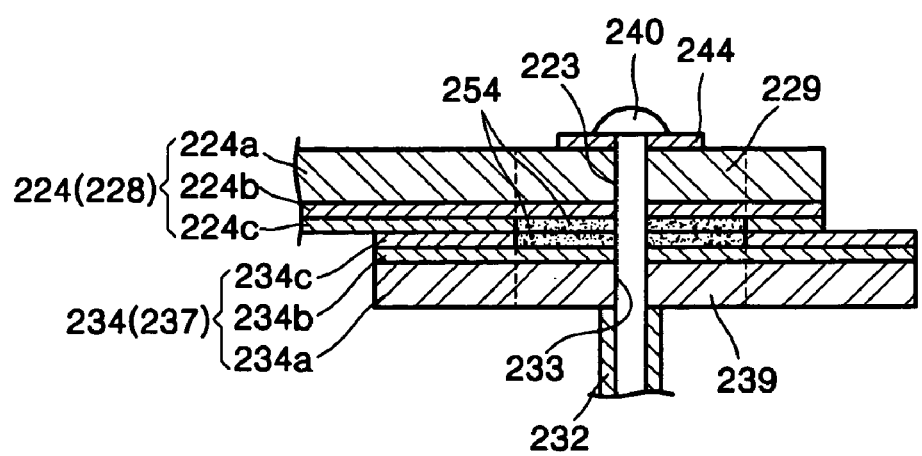
FIG. 9 is a cross-sectional view of a modified version of FIG. 8.

As illustrated in FIG. 9, the camera module 200 may also include the coupling element 240. In this case, coupling holes 223 and 233 may also be formed on the first and second signal transmitting elements 224 and 234. The coupling holes 223 and 233 are coupled by a coupling element 240, thereby securely coupling the first and second signal transmitting elements 224 and 234. The coupling element 240 may be a coupling mechanical component that couples the first and second signal transmitting elements 224 and 234 by passing through the coupling holes 223 and 233. Examples of the coupling mechanical component include a screw, a bolt, a key, a cotter, and a pin joint.

An embodiment having the above-described structure can be provided by, for example, modifying the camera module 200 of FIGS. 6 through 8 to include a boss unit 232 on top of the AF housing 131, coupling holes 223 and 233 and a screw for the coupling element 240. Thus, after the screw passes through the coupling holes 223 and 233 of the extension coupling portion 228 and the second signal transmitting element 234, the screw can be inserted into and coupled to the boss unit 232. As a result, the first and second signal transmitting elements 224 and 234 can be fixed.

Meanwhile, a passive device 143 may be installed on the second signal transmitting element 234. The passive device 143 is bonded to the second extension portion 237. In this case, the passive device 143 should not be damaged by the coupling element 140 when coupling the extension coupling portion 228 and the second extension portion 237. Therefore, preferably, the passive device 143 is mounted on the bottom surface of the second extension portion 237, closer towards the top surface of the AF housing 131, so that the passive device 143 is not exposed to the outside, and at the same time, the first signal transmitting element 224 is connected to the top surface of the second extension portion 237, further away from the AF housing 131, so that the first signal transmitting element 224 does not interfere with the passive device 143.

Figure 10:
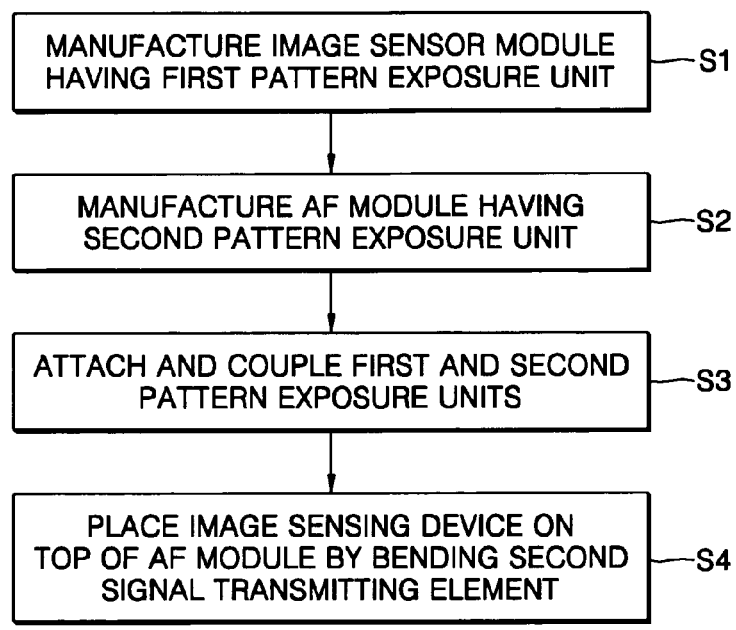
FIG. 10 is a flow chart illustrating a method of manufacturing a camera module according to an aspect of the present invention.

A method of manufacturing the camera module 200 having the above-described structure is illustrated in FIG. 10. The method includes manufacturing the image sensor module 220 (S1) and the AF module 230 (S2), attaching and coupling the first and second pattern exposure units 229 and 239 (S3), and bending the second signal transmitting element 234 to place the image sensing device 121 on top of the AF module 230 (S4).

Figure 11A:
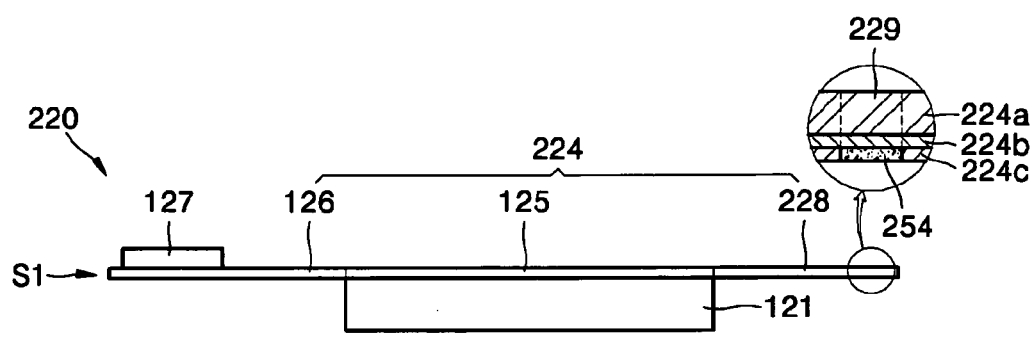
FIGS. 11A through 11D are side views of the camera module of FIG. 6 illustrating the operations of the method of manufacturing the camera module described in FIG. 10.

The method is explained in more detail with reference to FIGS. 11A through 11D. First, the image sensor module 220 is manufactured or otherwise provided as illustrated in FIG. 11A. The image sensor module 220 includes the image sensor device 121 and the first signal transmitting element 224 that is bonded and electrically connected to the image sensing device 121. The first signal transmitting element 224 includes the device coupling portion 125 coupled to the image sensing device 121, the external coupling portion 126 extending away from the image sensing device 121 in a first direction for connection with the external substrate, and the extension coupling portion 288 extending away from the image sensing device 121 in a direction opposite the first direction.

In addition, an area of the circuit pattern 224b, which is on the bottom portion of the extension coupling portion 228, that will contact with the second signal transmitting element 234 is exposed. The adhesive 254 of a conductive film, a conductive paste, or a nonconductive paste may be formed, deposited or otherwise applied on top of the exposed circuit pattern 224b.

Figure 11B:
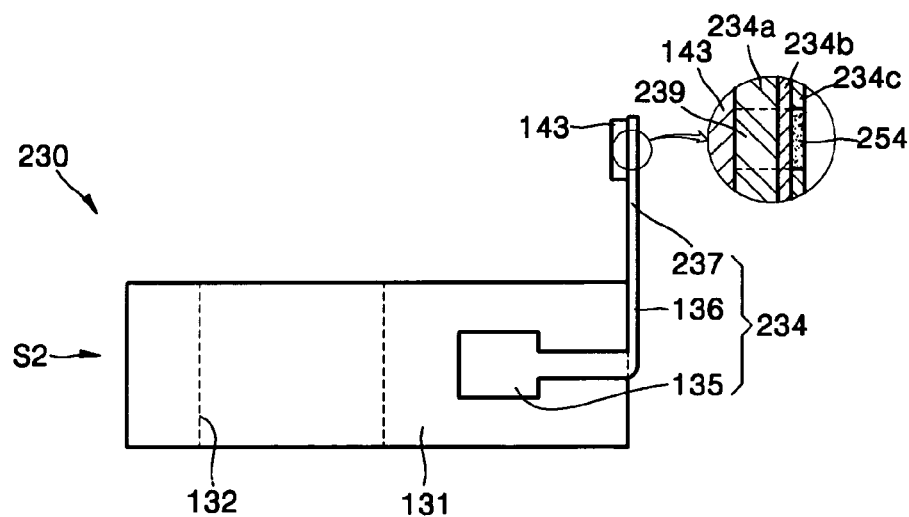

Then, the AF module 230 is manufactured or otherwise provided as illustrated in FIG. 11B. The second signal transmitting element 234 is formed on the AF module 230, a portion of which wraps around part of a sidewall of the AF housing 131 and another portion is perpendicular (i.e., vertical) to the AF housing 131. The passive device 143 may be attached to the bottom surface of the second signal transmitting element 234 towards the top surface of the AF housing 131. An area on the circuit pattern 234b that is to contact the extension coupling portion 228 is exposed. The adhesive 254 of a conductive film, a conductive paste, or a nonconductive paste may be formed, deposited or otherwise applied on top of the exposed circuit pattern 234b.

A hole 132 which accommodates a lens module (e.g., lens module 40 in FIG. 1), may be formed in the AF housing 131. The lens module may include a plurality of lenses (e.g., lens 42 in FIG. 1), which focus light onto the image sensing device 121.

During operation S2 in which the AF module 230 is manufactured the second signal transmitting element 234 is formed. The signal transmitting element 234 includes the AF connecting portion 135 connected to the AF device, the first extension portion 136 extending from the AF connecting portion 135 and attached along the side wall of the AF housing 131, and the second extension portion 237 extending from the first extension portion 136 in the same direction as the first extension portion 136 and has the second pattern exposure unit 239 formed therein.

Figure 11C:
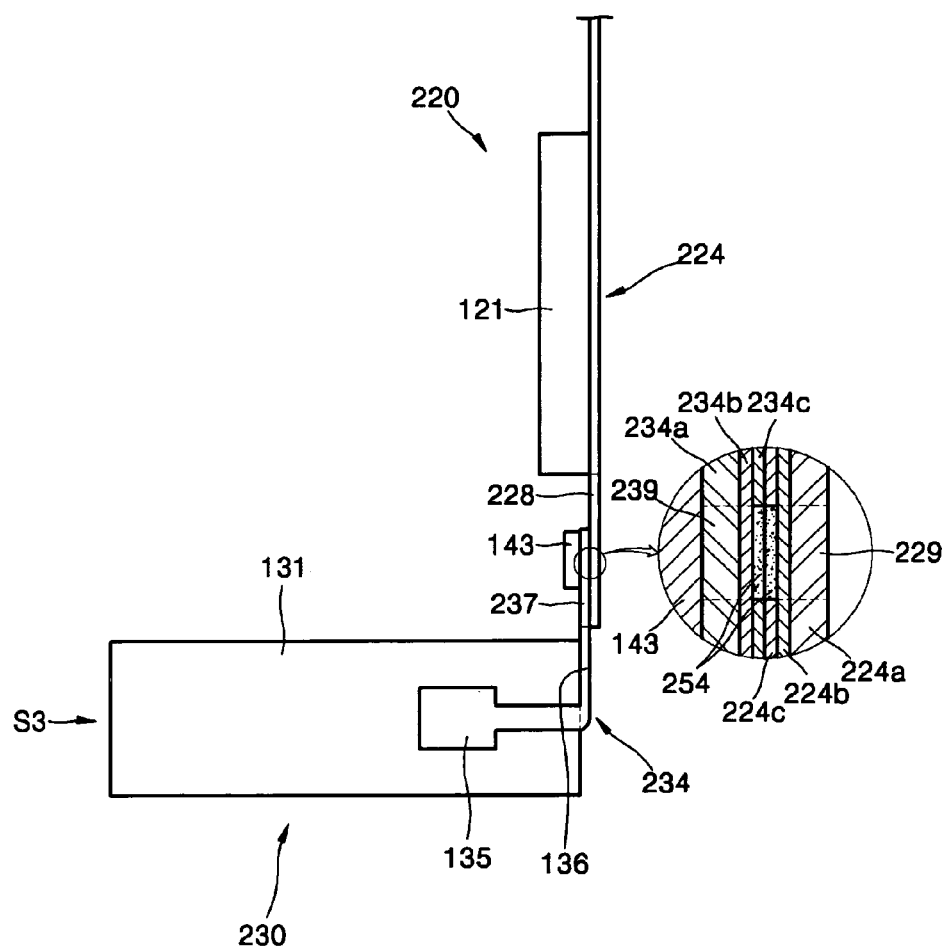

Then, the image sensor module 220 and the AF module 230 are coupled (S3), as illustrated in FIG. 11C. For the exposed circuit pattern 224b at the first signal transmitting element 224 of the image sensor module 220 and the exposed circuit pattern 234b at the second signal transmitting element 234 of the AF module 234 to contact each other, the extension coupling portion 228 is mounted on top of the second extension portion 237 on the opposite side to where the passive device 143 is attached.

Here, the extension coupling portion 228 is coupled to the second extension portion 237 of the second signal transmitting element 234 before the second extension portion 237 is bent from the first extension portion 136, to attach the first and second signal transmitting elements 224 and 234 without applying force to the passive device 143. Indeed, as can be appreciated, the elements 224, 234 may be coupled together with mechanical means such as fasteners, adhesives or other means.

Figure 11D:
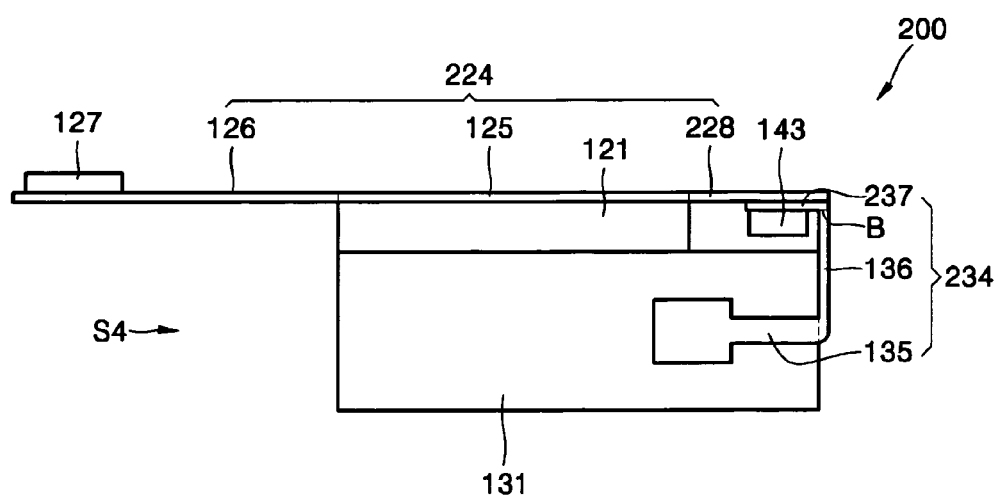

Then, as illustrated in FIG. 11D, the second extension portion 237 and the first signal transmitting element 224 coupled thereto are bent at a boundary B of the first extension portion 136 and the second extension portion 237, towards the AF housing 131, thereby connecting the image sensing device 121 on top of the AF housing 131.

Additionally, if the extension coupling portion 228 and the second extension portion 237 are coupled with the adhesive 254, the portions 228, 237 can be further coupled to each other via the coupling element 140 (see FIG. 5).

According to a camera module of the present invention including an AF module and an image sensor module, only a single port that is coupled to an external substrate is required. Consequently, signals and power transmitted to the AF module and the image sensor module are processed by a single signal transmitting element, thereby reducing cost of the camera module and signal loss due to noise.

In addition, the size of the camera module is reduced and simplified since the AF module is placed on top of the image sensor module and the number of connectors is reduced for connecting the camera module to a device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A camera module comprising:
   an image sensing device;
   a first signal transmitting element including:
   a device coupling portion that is coupled to the image sensing device;
   an external coupling portion that extends away from the device coupling portion in a first direction, wherein the external coupling portion is adapted for coupling to an external substrate; and
   an extension coupling portion that is linked with and extended away from the device coupling portion in a direction opposite to the first direction, wherein the extension coupling portion has a first pattern exposure unit that exposes a first circuit pattern;
   an auto-focus module including an auto-focus device in communication with the image sensing device, and a second pattern exposure unit that exposes a second circuit pattern that is physically adapted to couple with the first circuit pattern;
   a lens module adapted for insertion into the auto-focus module and including a plurality of lenses for focusing light onto the image sensing device; and
   an adhesive disposed in a horizontal gap between the first and second pattern exposure units to electrically connect the first and second circuit patterns wherein the first circuit pattern and the second circuit pattern are directly physically adhered to one another by the adhesive.

2. The camera module of claim 1 wherein the auto-focus module further comprises:
   an auto-focus connecting portion that is connected to the auto-focus device;
   a first extension portion that extends away from the auto-focus connecting module and is attached along a side surface of an auto-focus housing; and
   a second extension portion linked with the first extension portion, wherein the second extension portion is parallel to a top surface of the auto-focus housing, wherein
   the second pattern exposure unit is disposed on a surface of the second extension portion.

3. The camera module of claim 2 wherein a passive device is installed on the second extension portion opposite the surface including the second pattern exposure unit.

4. The camera module of claim 1 further comprising a coupling element that fastens the first signal transmitting element and a second signal transmitting element together so that the first and second circuit patterns make electrical contact with each other.

5. The camera module of claim 4 further comprising coupling holes through the extension coupling portion and the second extension portion, wherein the coupling element is selected from the group consisting of a screw, a bolt, a key, a cotter, a clamp and a pin joint.

6. The camera module of claim 5, wherein the auto-focus module comprises:
   a condenser lens in communication with the lens module; and
   a boss unit formed on a top surface of the auto-focus housing, wherein the boss unit is aligned with the coupling holes and adapted for receiving and retaining the coupling element therein.

7. The camera module of claim 1 wherein the first signal transmitting element comprises a flexible printed circuit board.

* * * * *